United States Patent [19]

Andersson

[11] Patent Number: 5,663,619

[45] Date of Patent: Sep. 2, 1997

[54] SENSOR INTENDED TO DETECT THE ROTATIONAL POSITION OF A ROTATABLE DEVICE

[75] Inventor: Kaj Andersson, Mellerud, Sweden

[73] Assignee: Saab Automobile Aktiebolag, Sweden

[21] Appl. No.: 443,689

[22] Filed: May 18, 1995

[30] Foreign Application Priority Data

May 26, 1994 [SE] Sweden ................. 9401855

[51] Int. Cl.6 .................. B60J 7/04; F02D 11/10
[52] U.S. Cl. ............... 318/254; 318/468; 318/663; 296/223
[58] Field of Search .............. 318/139, 245–293, 318/430–480, 663, 615, 664, 665; 475/162; 296/216, 223, 221; 123/361, 399; 180/178, 197

[56] References Cited

U.S. PATENT DOCUMENTS

| | | | |
|---|---|---|---|
| 3,878,652 | 4/1975 | Mosher | 51/165.89 |
| 4,060,274 | 11/1977 | Bienert et al. | 296/137 G |
| 4,272,125 | 6/1981 | Bienert et al. | 296/223 |
| 4,420,185 | 12/1983 | Bienert et al. | 296/223 |
| 4,436,338 | 3/1984 | Jardin | 296/223 |
| 4,468,063 | 8/1984 | Yukimoto et al. | 296/223 |
| 4,518,181 | 5/1985 | Yamada | 292/201 |
| 4,659,141 | 4/1987 | Masuda et al. | 296/223 |
| 4,854,183 | 8/1989 | Periou et al. | 74/113 |
| 4,893,870 | 1/1990 | Moriya et al. | 296/223 |
| 4,914,368 | 4/1990 | Orton | 318/663 |
| 5,058,939 | 10/1991 | Miilu | 292/110 |
| 5,098,152 | 3/1992 | Sakai | 296/223 |
| 5,161,504 | 11/1992 | Guest et al. | 123/361 |
| 5,181,891 | 1/1993 | Pohl et al. | 475/162 |

Primary Examiner—Paul Ip
Attorney, Agent, or Firm—Ostrolenk, Faber, Gerb & Soffen, LLP

[57] ABSTRACT

A sensor which is intended to detect the rotational position of a rotatable device, e.g. a shaft or a rotatable hatch, which is rotatable, preferably by a motor, incorporates a position detector and a potentiometer. To improve the potentiometer's accuracy within part of the relevant rotation range of the device, a cam mechanism is arranged between the potentiometer and the rotatable device.

18 Claims, 2 Drawing Sheets

SENSOR INTENDED TO DETECT THE ROTATIONAL POSITION OF A ROTATABLE DEVICE

BACKGROUND OF THE INVENTION

The invention relates to a sensor intended to detect the rotational position of a device (e.g. a shaft) which is rotatable preferably by an engine, whereby the position of the rotary shaft of the position detector represents the rotational position of the rotatable device to control the motor which rotates the device, for controlling the motor which rotates the device, and more particularly relates to a cam mechanism between the position detector and the rotatable device.

Previously known in various contexts is the use of a potentiometer as position sensor for detecting the rotational position of a shaft. Potentiometers have the advantage of being easy to manufacture in large series and therefore being inexpensive, at least so long as standardized potentiometers can be used. A disadvantage, however, is that their accuracy is relatively poor. In cases where better accuracy is required, the potentiometer has to be manufactured with greater accuracy at consequently higher cost. One characteristic of potentiometers is that they have the same accuracy along with whole of their relevant rotary movement. In certain cases greater accuracy is only required along a smaller part of the rotary movement and it is possible within other rotational sectors to accept somewhat inferior accuracy of resolution. Although greater accuracy is only required within a limited range, it is necessary in such cases to use a more accurate potentiometer which is then unnecessarily accurate within other ranges.

An example in the vehicle industry where the problem mentioned arises is in motorcars of the convertible type. These motorcars have a folding hatch or cover which is intended to cover the hood in the folded position. This hatch is operated by means of an electric motor which opens and closes the hatch as required. Previously known is the use of a potentiometer for detecting the position of the shaft of the motor which is used for operating the hatch. However, using standard potentiometers results in poor hatch control accuracy. Either the hatch does not close fully or the closing movement ceases too late, with consequent risk of damage to other components. Certain parts are also liable to corresponding problems pertaining to detecting the hatch in its fully open position. The alternative of using a potentiometer with greater accuracy involves the disadvantage of a substantially higher price. The problem is therefore to find a solution whereby the position of the hatch can be detected with sufficient accuracy for being able to stop the drive motor at the exact position particularly of the closed hatch but also to some extent of the open hatch, without having to use an expensive potentiometer. Corresponding problems also arise with other types of position detecting sensors, e.g. inductive sensors.

SUMMARY OF THE INVENTION

The object of the present invention is to solve the aforesaid problem and thus make it possible to use an inexpensive standard type of potentiometer, or some other type of sensor as position detector which can be used for detecting the position of a rotatable shaft (or a corresponding device) but which has better accuracy of resolution than a conventional sensor, at least within a certain angular range.

According to the invention, the characteristics aimed at are achieved by the position sensor including a position detector having a rotatory shaft whose rotary position represents the rotational position of the rotatable device. The rotatable device may be the shaft in an automotive vehicle which moves a hatch. The detector in a preferred embodiment is connected with the motor moving the shaft, the detector for controlling the motor based on the detected position of the rotary shaft.

A cam mechanism connects the rotary shaft of the detector with the rotatable device or shaft. The cam mechanism includes a cam device connected to either the rotary shaft of the detector or to the rotatable device, and in a preferred embodiment to the rotatable device. There is a guiding device that is connected to the other of the detector and the rotary shaft of the potentiometer, and in a preferred embodiment to the potentiometer shaft. The guiding device cooperates with the cam disc such that movement of the cam disc causes the guiding device to move according to the shape of the cam. As a result, the rotary position of the rotatable device sets the rotary position of the rotary shaft of the detector.

In a preferred embodiment, the position detector is a potentiometer having a rotary shaft, the rotary position of which detects the rotary position of the rotatable device. The cam disc is rotatable about a first shaft while the guiding device is rotatable about a second parallel shaft. The cam disc is rotatable within a first angular sector while the potentiometer shaft is rotatable within a different second angular sector, and the first angular sector is preferably larger than the second. The arrangement is such that rotation of the cam disc through rotation of the rotating device or shaft causes rotation of the potentiometer shaft acting through the guiding device.

In a preferred embodiment, the cam disc includes a guiding surface which engages the guiding device, such that rotation of the cam disc imparts movement to the rotary shaft of the potentiometer with the first angular sector of rotation of the cam disc causing a second angular sector of rotation of the rotatory shaft of the potentiometer. At different locations around the cam disc, different degrees of rotation produce different amounts of rotation of the potentiometer shaft. Sensor accuracy can be substantially improved by arranging a cam transmission between the shaft of the sensor's position detector (e.g. the shaft of a potentiometer) and the shaft whose rotary movement is to be detected. This makes it possible to use a standard potentiometer in applications which previously required a more expensive and more accurate potentiometer. Using a cam transmission has the further advantage that the potential rotary movement of the detecting shaft need not be the same as the potential rotary movement of the shaft of the detector or potentiometer. This means that substantially the whole potential rotary movement of the detector or potentiometer can be used for detection. The most essential point, however, is that the accuracy of the detector or potentiometer is improved and that the control device or the like which is controlled on the basis of the position detected can be controlled with greater accuracy. In the particular example above, this means that the hatch closing movement can be halted at the correct time.

Further characteristics and advantages distinguishing the invention are indicated in the attached description, in which the invention is exemplified in two embodiments.

Other features and advantages of the present invention will become apparent from the following description of the invention which refers to the accompanying drawings.

BRIEF DESCRIPTION OF THE DRAWING(S)

The description refers to the attached drawings, in which.

DETAILED DESCRIPTION OF EMBODIMENTS OF THE INVENTION

Figure 1:
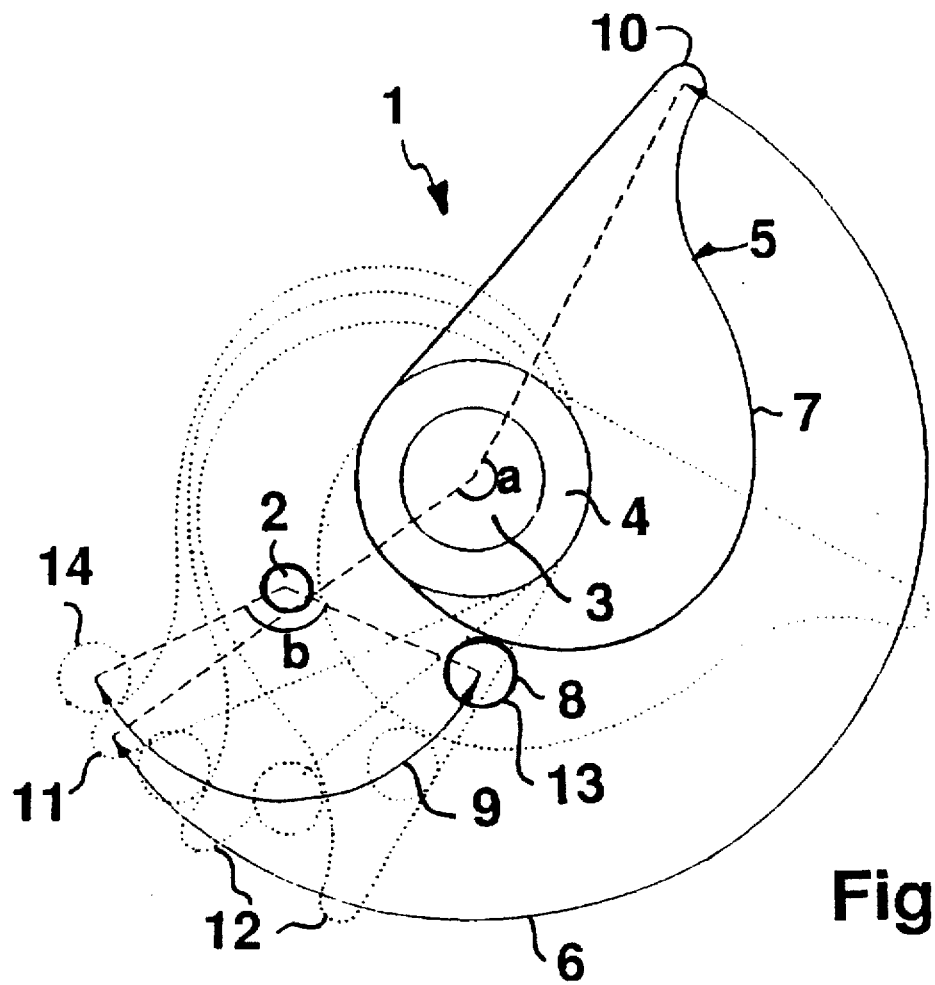
FIG. 1 depicts a first embodiment of a cam mechanism incorporated in the sensor.
Figure 2:
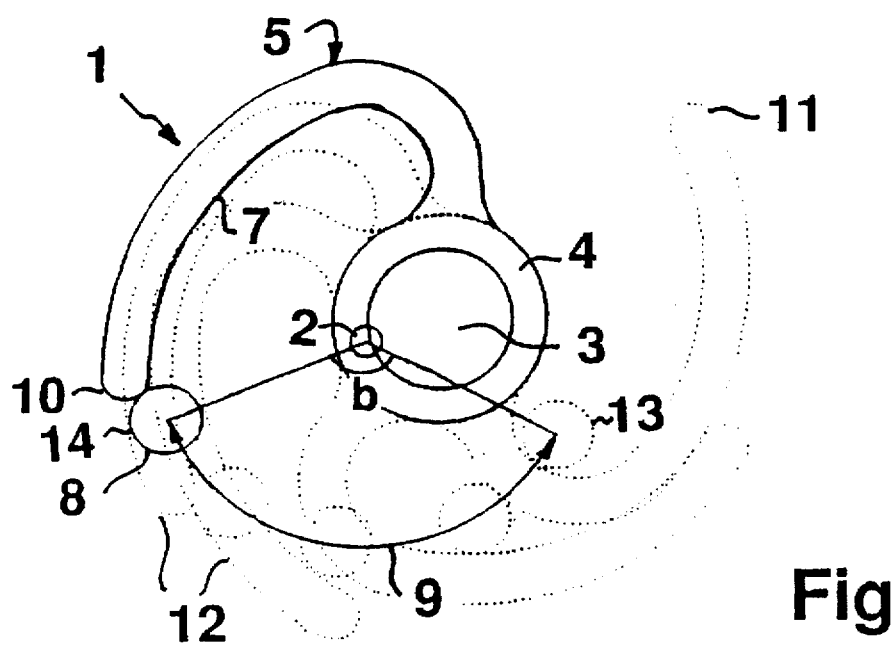
FIG. 2 depicts a second embodiment of a cam mechanism incorporated in the sensor.

The attached FIGS. 1 and 2 depict two variants of a cam mechanism 1 which forms an essential part of a position detecting sensor. In this example the sensor is intended for use in an arrangement on a vehicle of convertible type in which the hood in the lowered position is covered by a rotatable hatch. In this case the rotary movement of the hatch, i.e. the opening and closing of the hatch, is effected by means of an electric motor. The sensor is intended to detect the position of the hatch so that the drive provided by the motor can be switched off at the respective final position of the hatch. When closing the hatch, it is important that the closing movement should not cease so early that the hatch is not fully closed. It is also important that the hatch closing movement should not cease so late that closure in practice does not take place before other components have become abnormally deformed. It is similarly important that the hatch opening movement can be halted at the correct position. For this reason the sensor is designed to have greater accuracy for detecting the position of the hatch in the region of the hatch closed position and the hatch fully open position than for the other hatch positions, as indicated in more detail in the description below.

Figure 3:
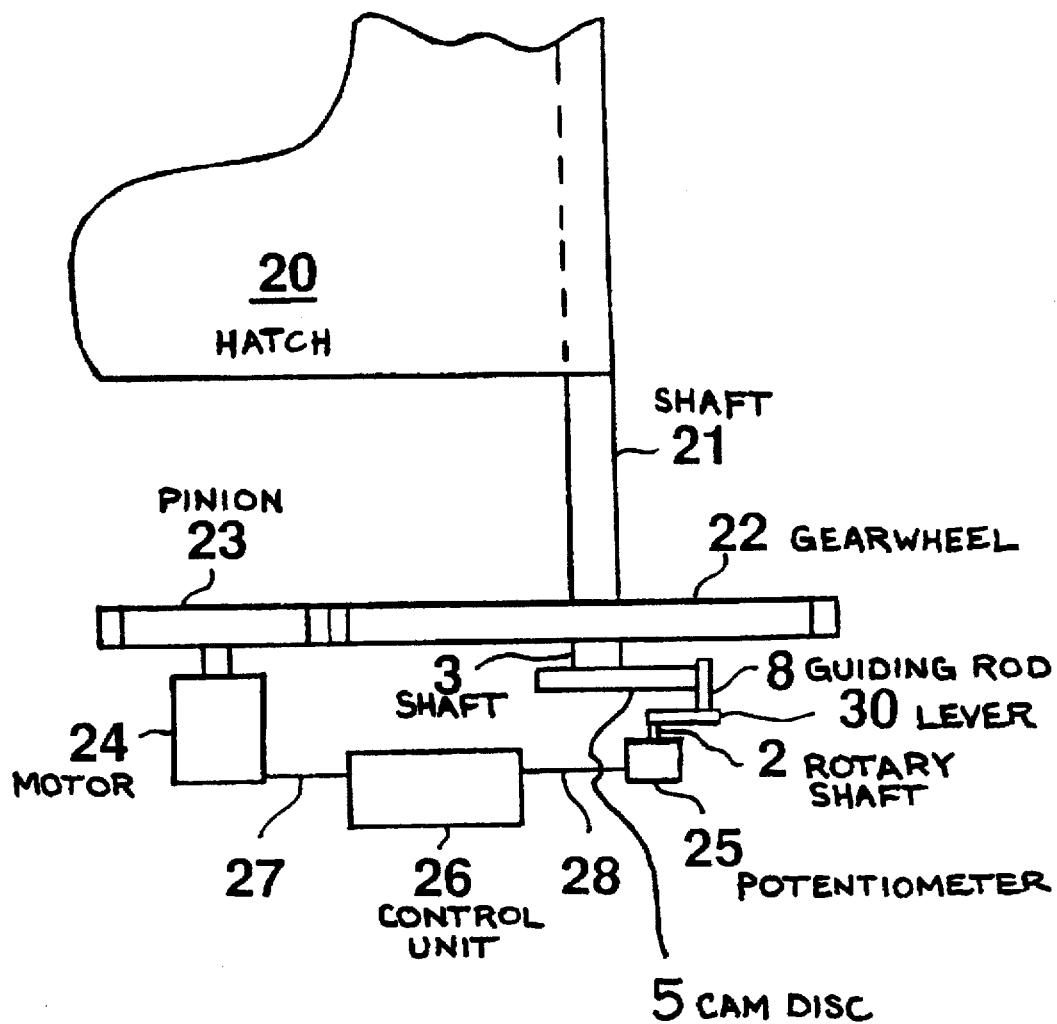
FIG. 3 depicts schematically an arrangement on a vehicle whereby a sensor according to FIG. 1 is used for determining the position of a rotatable hatch.

FIG. 3 is a schematic representation of such an arrangement in which a partly depicted hatch 20 is rotatable about a shaft 21. This shaft 21 is rotatably connected (and in this example is also directly connected) to a gearwheel 22 which forms part of a transmission which also incorporates a pinion 23 connected to the electric motor 24 which operates the hatch 20. A sensor for detecting the rotational position of the hatch 20 is arranged on the gearwheel 22 which is firmly connected to the hatch shaft 21. The sensor is built up around a position detector in the form of a potentiometer 25 which in an inherently conventional manner exhibits a variable resistance depending on the position of the operating shaft or operating lever of the potentiometer 25. In this example the potentiometer 25 is a rotary potentiometer in which the position of a rotary shaft 2 of the potentiometer 25 is used for representing the position of the hatch 20. The resistance which the potentiometer 25 exhibits is used for detecting by means of ordinary electronic circuits the position at the time of the hatch 20 and for controlling on the basis thereof the electric motor 24 which operates the hatch 20. These electronic circuits appear in the diagram in the form of a control unit 26 which is connected to the motor 24 by wiring 27 and to the potentiometer 25 by other wiring.

A transmission in the form of a cam mechanism 1 which is shown in more detail in FIG. 1 is used for transmitting the rotational position of the hatch 20 to the potentiometer 25. The cam mechanism 1 incorporates a shaft 3 which forms part of or is connected to the transmission which connects the motor 24 to the rotary shaft 21 of the hatch. In this example the shaft 3 is directly connected to the gearwheel 22 and to the rotary shaft 21 of the hatch. A cam disc 5 provided with a hub 4 is fastened to the shaft 3. The possible range of rotation of the shaft 3 comprises an angular sector 6 corresponding to an angle a and corresponds to the movement within which the hatch 20 can move. The cam disc 5 is designed with a guiding surface 7 directed radially outwards which cooperates with a guiding device in the form of a guiding rod 8 abutting against the guiding surface 7. The rotary shaft 2 of the potentiometer is arranged coaxially and parallel with the rotary shaft 3 of the cam disc 5 which means that the cam disc 5 and the guiding rod 8 are rotatable about mutually parallel shafts. A lever 30 which bears the guiding rod 8 is fastened to the rotary shaft 2 of the potentiometer. In its simplest embodiment the guiding rod 8 is quite firmly connected to the lever 30, which means that it will execute a sliding movement relative to the guiding surface 7 of the cam disc. In more developed embodiments the guiding rod 8 may instead be bearing firmly to the lever 30 so that the guiding rod 8 can roll along the guiding surface 7. A spring is arranged around the rotary shaft 2 of the potentiometer to ensure that the guiding rod 8 always abuts against the guiding surface 7 of the cam disc. The possible range of rotation of the rotary shaft 2 of the potentiometer comprises an angular sector 9 corresponding to an angle b. In this example the rotational range 6 of the cam disc 5, i.e. the angle a, is approximately 200 degrees while the rotational range 9 of the potentiometer 25, i.e. the angle b, is 135 degrees. The rotational range of the cam disc 5 is thus substantially greater than the rotational range 9 of the potentiometer 25. The whole range of movement of the hatch is thus adapted to the whole range of movement of the potentiometer to facilitate maximum possible use of the whole range of movement of the potentiometer and hence make full use of the latter's accuracy. In alternative embodiments the relationship may be entirely the opposite, i.e. the rotational range 6 of the cam disc may be substantially smaller than the rotational range 9 of the potentiometer shaft 2.

In FIG. 1 continuous lines are used to represent the cam disc 5 in a first end position to which corresponds to the position assumed by the cam disc 5 when the hatch 20 is fully closed. Dotted lines are used to represent the cam disc 5 not only in a second end position 11 corresponding to the fully open position of the hatch 20 but also in two intermediate positions 12. Correspondingly, continuous lines are used to represent the guiding rod 8 of the potentiometer in an end position 13 corresponding to the position in which it is when the hatch 20 is fully closed. Dotted lines are used to represent the other end position of the guiding rod 8 corresponding to the fully open hatch 20, and also a number of intermediate positions. The guiding surface 7 of the cam disc is designed so that movements in the vicinity of its two end positions 10, 11 cause relatively great angular rotation of the potentiometer shaft 2, whereas rotary movements between these end positions 10, 11 cause relatively small angular rotation of the potentiometer shaft 2. The result is relatively greater accuracy of resolution in the end regions than in an intermediate region. This makes it possible to use a relatively simple standard design of potentiometer despite the fact that such potentiometers in other respects have limited accuracy of resolution. In the example depicted, the guiding rod S in its one end position 13 abuts against the guiding surface 7 at a short distance from the shaft 3, whereas in its other end position it abuts at a great radial distance from the shaft 3. In the corresponding one end position 13 the guiding surface 7 of the cam disc is designed with an almost tangential extent and in the corresponding other end position 14 with an almost radial extent. In an intermediate region in between, the cam disc 5 is designed with a shape almost concentric to the shaft 3. Rotation movements within the region which corresponds to the guiding rod 8 abutting against the guiding surface 7 in this intermediate region will thus not act upon the rotation of the potentiometer shaft 3 as greatly as rotation movements in the vicinity of the end positions 13, 14.

FIG. 2 depicts a modified embodiment of the cam mechanism 1 in which the greatest difference from what is described above is that the guiding rod 8 follows a radially internal guiding surface 7 on the cam disc 5 instead of an external guiding surface. FIG. 2 also represents by continuous lines the position of the cam disc 5 and the guiding rod 8 of the potentiometer in a position corresponding to hatch fully open. The similarities otherwise with what is described above are so great that the same notation references are used in FIG. 2 as in FIG. 1 to denote the same or analogous parts. The functioning of the embodiment depicted in FIG. 2 is also the same in that it exhibits greater accuracy in the vicinity of the end positions 10, 11 of the cam disc 5 than within an intermediate region. In this case likewise the guiding surface 7 of the camshaft extends, for the purpose stated, in an intermediate region almost concentrically with the shaft 5 whereby rotation movements within the intermediate region do not act upon the rotation of the potentiometer shaft as greatly as rotation movements in the vicinity of the end positions 13, 14.

In the embodiment depicted, the more detailed design of the guiding surface 7 of the cam disc is chosen such that the accuracy is greatest in the latter's end positions 10, 11. In alternative embodiments a different angular range may be chosen instead, entirely depending on requirements.

The invention is not confined to embodiments depicted nor to the application range exemplified but may, within the scope of the attached patent claims, be used where corresponding problems arise and there is need to detect the angular position of a rotatable device.

In alternative embodiments of the invention, the cam disc 5 may instead be designed with a guiding groove which analogously guides the guiding rod 8 acting upon the potentiometer. In such cases the spring acting upon the potentiometer shaft may be omitted, since the contact between the guiding rod 8 and the guiding surface 7 of the cam disc is positively controlled by the guiding groove.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sensor for detecting the rotational positions of a rotatable device, the sensor comprising:
   a position detector having a rotary shaft and the rotary shaft having rotary positions which represent the rotational positions of the rotatable device;
   a cam mechanism connecting the rotary shaft of the detector with the rotatable device, the cam mechanism including:
   a cam disc having a cam surface, the cam disc being connected to the rotatable device, and
   a guiding device connected to the rotary shaft of the detector;
   the guiding device cooperating with the cam disc such that movement of the cam disc causes the guiding device to move according to the shape of the cam surface;
   the rotational positions of the rotatable device setting the rotary positions of the rotary shaft of the detector such that a first amount of rotation of the cam disc imparts a second amount of rotation to the rotary shaft of the detector, while a third amount of rotation of the cam disc, which third amount of rotation is equal to the first amount of rotation of the cam disc imparts a fourth amount of rotation of the rotary shaft of the detector which is different than the second amount of rotation.

2. The sensor of claim 1, wherein the rotatable device includes a motor operable for rotating the rotatable device and the position detector is connected to the motor for controlling the motor for rotating the rotatable device based on the detected position of the rotary shaft of the detector.

3. The sensor of claim 2, further comprising a second shaft connected to and rotatable with the rotatable device, the cam disc being connected to the second shaft.

4. The sensor of claim 2, further comprising a first shaft about which the cam disc is rotatable and a second shaft parallel to the first shaft about which the guiding device is rotatable.

5. The sensor of claim 2, wherein the position detector comprises a potentiometer having the rotary shaft, whose rotary positions detect the rotational positions of the rotatable device.

6. The sensor of claim 5, wherein the cam disc is connected to the rotatable device, and the guiding device is connected to the rotary shaft of the potentiometer.

7. The sensor of claim 6, further comprising a second shaft on which the cam disc is rotatable.

8. The sensor of claim 7, wherein the rotary shaft and the second shaft are parallel.

9. The sensor of claim 7, wherein the cam disc is rotatable within a first rotation angular sector, and the potentiometer shaft is rotatable within a second rotation angular sector.

10. The sensor of claim 9, wherein the first and second rotation angular sectors are different.

11. The sensor of claim 9, wherein the first rotation angular sector is larger than the second rotation angular sector.

12. The sensor of claim 9, wherein the cam disc is connected with the rotatable device such that rotation of the rotatable device rotates the cam disc and the cam disc is so connected with the potentiometer shaft that rotation of the cam disc causes rotation of the potentiometer shaft.

13. The sensor of claim 1, wherein the fourth angular sector of movement is greater than the second angular sector of movement of the potentiometer shaft.

14. The sensor of claim 1, wherein the fourth angular sector of movement is smaller than the second angular sector of movement of the potentiometer shaft.

15. The sensor of claim 1, wherein the first angular sector is in the vicinity of one of the end positions of rotation of the cam disc.

16. The sensor of claim 5, wherein the guiding device comprises a guiding rod; the potentiometer has a rotary shaft and the guiding rod is connected on the potentiometer rotary shaft.

17. The sensor of claim 16, further comprises a lever connecting the guide rod to the rotary shaft of the potentiometer.

18. The sensor of claim 3, and a hatch connected with the motor for being rotated by the motor to various positions, wherein the sensor determines the angular position of the hatch and the motor;
   the detector is connected to control the motor on the basis of the position detected by the detector;
   the cam disc is connected to the hatch for rotating with the rotation of the hatch; and
   the potentiometer shaft is connected to the guiding device.

* * * * *